(12) United States Patent
Cheng et al.

(10) Patent No.: US 8,139,529 B2
(45) Date of Patent: Mar. 20, 2012

(54) TD-SCDMA BASED SFN NETWORK AND ASSOCIATED METHODS

(75) Inventors: Jian Cheng, Shanghai (CN); Jingdong Lin, Irvine, CA (US)

(73) Assignee: Spreadtrum Communications, Inc., George Town, Grand Cayman (KY)

( * ) Notice: Subject to any disclaimer, the term of this patent is extended or adjusted under 35 U.S.C. 154(b) by 1086 days.

(21) Appl. No.: 12/022,797

(22) Filed: Jan. 30, 2008

(65) Prior Publication Data

US 2009/0190559 A1    Jul. 30, 2009

(30) Foreign Application Priority Data

Jan. 31, 2007   (CN) .......................... 2007 1 0037001

(51) Int. Cl.
*H04W 4/00*   (2009.01)

(52) U.S. Cl. ......... 370/329; 370/341; 370/342; 370/348
(58) Field of Classification Search .................. 370/329, 370/330, 335, 345, 347, 348, 350, 341, 342; 375/150, 350, 368; 725/62
See application file for complete search history.

(56) References Cited

U.S. PATENT DOCUMENTS

| | | | |
|---|---|---|---|
| 2003/0118134 A1* | 6/2003 | Harris | 375/350 |
| 2006/0227857 A1* | 10/2006 | Gaal | 375/150 |
| 2006/0280273 A1* | 12/2006 | Mueller-Weinfurtner | 375/368 |
| 2007/0240188 A1* | 10/2007 | Vermola et al. | 725/62 |
| 2008/0101326 A1* | 5/2008 | Zhang et al. | 370/345 |

* cited by examiner

*Primary Examiner* — Hassan Kizou
*Assistant Examiner* — Toan Nguyen

(57) ABSTRACT

Networking methods of a Single Frequency Network (SFN) in communication systems are disclosed.

10 Claims, 4 Drawing Sheets

TD-SCDMA BASED SFN NETWORK AND ASSOCIATED METHODS

CROSS-REFERENCE TO RELATED APPLICATION(S)

This application claims priority to Chinese Application No. 200710037001.3 filed Jan. 31, 2007.

TECHNICAL FIELD

The present invention relates to receiving methods for mobile broadcast services, such as mobile TV broadcast, based on TD-SCDMA network.

BACKGROUND

The 3rd generation mobile communication standards include FDD (Frequency Division Duplex), TDD HCR (Time Division Duplex, High Chip Rate) and TDD LCR (Time Division Duplex, Low Chip Rate). WiMAX joined the 3rd generation mobile communication standards recently. Usually FDD is named WCDMA, and TDD LCR is named TD-SCDMA.

The core technology of TD-CDMA system focuses on Smart Antenna, Dynamic Channel Allocation, Unsymmetrical Allocation of the uplink/downlink service and the Joint detection receiving technology. TD-SCDMA network can be constructed in intra-frequency mode and is a code resource limited system, which overwhelms WCDMA system in frequency reusable efficiency.

The network configuration of TD-SCDMA can be implemented in the form of inter-frequency network or intra-frequency network. The latter further includes 1.6 MHz intra-frequency network and 5 MHz intra-frequency network. The multiple accessing for neighboring cells is based on FDMA for inter-frequency configuration. The assigned frequency resources can be utilized for all Node-Bs in 1.6 MHz intra-frequency network. The 1.6 MHz intra-frequency network configuration has the highest frequency efficiency with severe intra-frequency interference. 5 MHz intra-frequency configuration based on N frequency point protocol is the tradeoff of the inter-frequency and intra-frequency technology. In such a configuration, the 0th timeslot bearing common control information, such as PCCPCH/SCCPCH information, is inter-frequency configured, while the 1st to 6th timeslots are intra-frequency configured. Smart antenna and dynamic channel allocation can be adopted for intra-frequency configured TD-SCDMA system to decrease the strong intra-frequency interference.

FIG. 1 shows a typical TD-SCDMA network. As shown in FIG. 1, the TD-SCDMA network is a traditional 3G mobile communication network having a location area, a registration area, and a routing area concept. The TD-SCDMA network is also a mobile broadcast network with distributed transmission. The mobile user equipment (UE) does not care much for the downlink transmission from one special Node-B, but utilizes all downlink transmission from all recognizable Node-Bs by diversity combining. The effective channel estimation is shown in FIG. 2. The SFN and the communicating TD-SCDMA network can be merged into one layer in which some timeslots are used for traditional mobile communications and the other timeslots, for example, TS6, are reserved for mobile broadcast service.

DETAILED DESCRIPTION

A receiving method for SFN based on a TD-SCDMA network is disclosed. Compared to the traditional joint-detection receiving algorithm, the method proposed in the invention can decrease the computation complexity, and thus achieving the same detection performance as with the traditional Joint-Detection algorithm more efficiently.

In several embodiments, the receiving method for the SFN based on TD-SCDMA includes: dividing the TD-SCDMA network into two layers: one layer is for mobile communications network, and the other layer is for TD-SCDMA single frequency network (SFN). The TD-SCDMA SFN is independent from the TD-SCDMA communication network, i.e., some frequency resources are reserved for SFN only; or partial timeslot resources are used for mobile communication, and the rest of the timeslot resources are used for SFN service. Channel estimation should be performed first, and then signal detection is performed by an equalization algorithm.

A typical detection algorithm for TD-SCDMA is the Joint-Detection algorithm, especially for intra-frequency multi-user detection. The computation complexity of the channel estimation based on interference cancellation is overwhelming, and the power consumption is also large. Several embodiments of the method provide a new detection technique based on equalization algorithm for the TD-SCDMA SFN to decrease computation complexity and power consumption.

In several embodiments, only one basic midamble code exists for the SFN network. In the SFN carrying e.g., mobile TV broadcast service and based on TD-SCDMA network, the midamble code is not correlated to the downlink pilot code, i.e., the code group concept defined in 3GPP 25.221 does not exist any more for the SFN network. The phase shifting mode is fixed, and the length of the midamble code is configurable for larger transmission delay from multiple recognizable Node-Bs.

Figure 1:
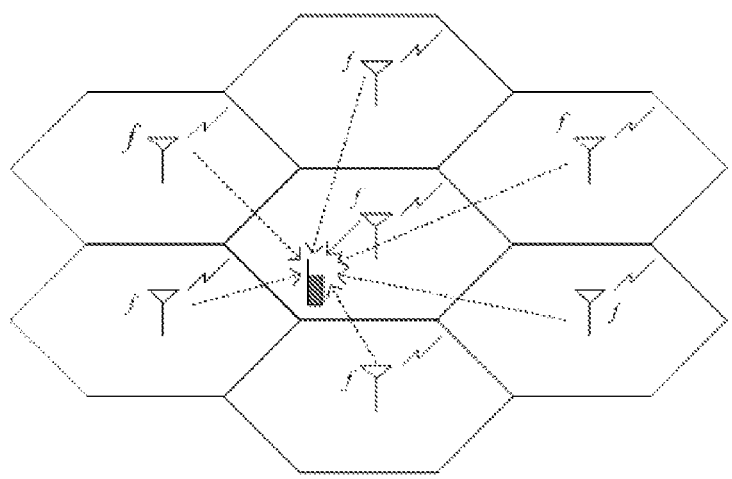
FIG. 1 is a schematic of a SFN base on TD-SCDMA.
Figure 2:
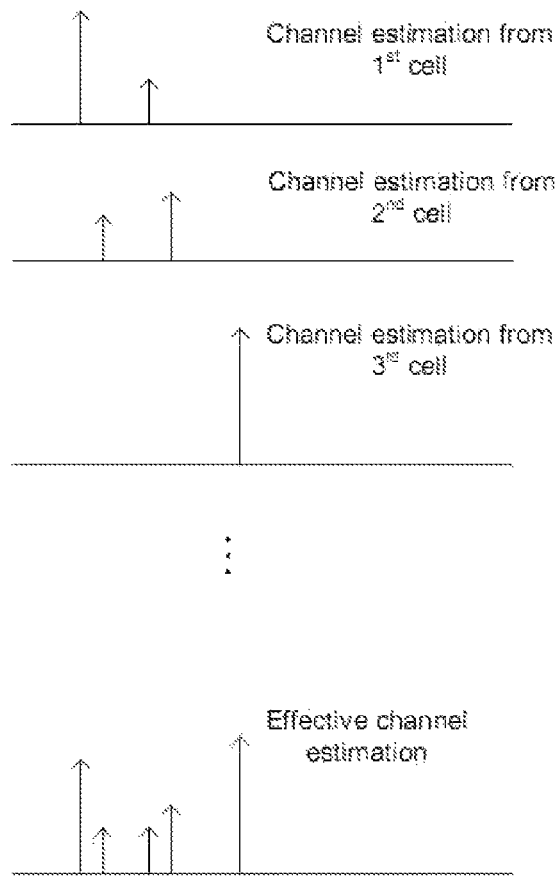
FIG. 2 illustrates effective channel estimation.
Figure 3:
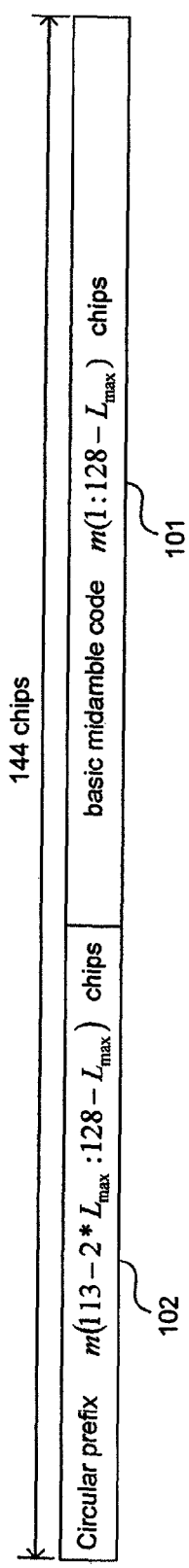
FIG. 3 is a diagram of prefix-configurable midamble code.

Midamble code forming is shown in FIG. 3. As shown in FIG. 3, the midamble code includes a circular prefix 102 with $L_{max}+16$ chips, and the basic midamble code 101 with $128-L_{max}$ chips. $L_{max}$ is a configurable parameter usually set to [−8 48] while the default value is set to 16. The midamble code, which has 144 chips, includes a midamble code, which can be from a shortened basic midamble code with length of 128 chips or a random code. The prefix 102 is the first part of the midamble code, which is the copy of the last part of the basic midamble code or the selected random code. Then the system can tolerate $L_{max}+16$ chips multi-path duration; if $L_{max}=16$ is set, the system can support 32 chips multi-path delay. The diversity receiver can be applied for the downlink receiving of the mobile TV broadcast. $L_{max}$ can be adjusted according to the requirements.

It supposes that the m is the basic midamble, and the received midamble data is $r_m(n)$, $n=1,2,\ldots,144$, then the channel estimation can be as:

$$h = IFFT\left(\frac{FFT(r_m(L_{max}+17:144), 128-L_{max})}{FFT(m(1:128-L_{max}), 128-L_{max})}, 128-L_{max}\right)$$ (Equation 1)

Where FFT(x,l)IFFT(x,l) denotes the fast Fourier transform and the inverse fast Fourier transform of the vector x with length of l. l=112=7×16 when $L_{max}$=16.

The traffic of the SFN is characteristic of mobile broadcasting, and only one kind of the midamble code with the fixed phase shifting exists. As a result, the channel estimation procedure for every mobile UE can be the same. The receiver performs channel estimation first according to Equation 1, and then detects the signals. The receiver can utilize not only the traditional joint detection algorithm for signal detection, but also can apply the channel equalization algorithm for receiving.

Figure 4:
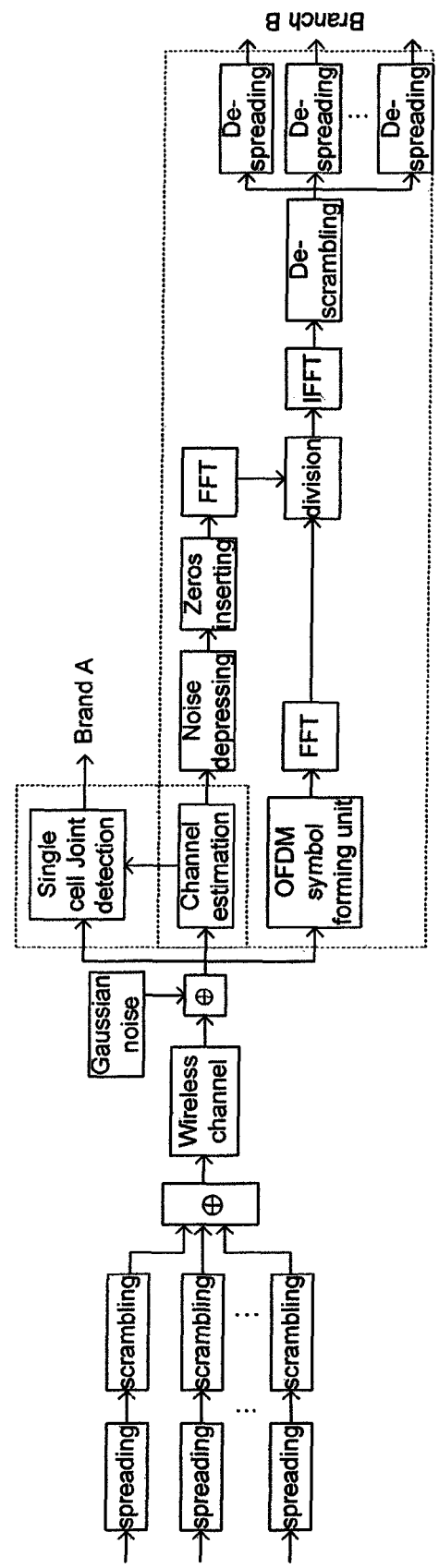
FIG. 4 shows system equalizing detection for a single and intra-frequency cell.

As shown in FIG. 4, the configuration diagram of the single cell joint detection includes the transmission part (all components except for branch A and branch B) and branch A, and the equalization algorithm includes the transmission part and branch B.

The joint detection algorithm for single cell is the same for traditional TD-SCDMA receiver: suppose the receiving model as:

$$r_d = As + n,$$

where $r_d$ is the received user data part; A is the transport matrix, which comprises of channelized code (e.g., spreading code, Walsh code), scramble code and the estimated channel; s is the modulated signal transmitted from the Node-B; n is the additive white noise. Then signal estimation by decorrelating detection technique is shown as follows:

$$\hat{s}_{ZF} = (A^H A)^{-1} A r_d$$ (Equation 2)

$$\hat{s}_{MMSE} = (A^H A + \delta_n^2 \cdot I)^{-1} A r_d$$ (Equation 3)

where $\hat{s}_{ZF}$ and $\hat{s}_{MMSE}$ are the detected signals by zero-forcing algorithm and minimum-mean-squared-error algorithm respectively, and $\delta_n^2$ is the variance of the Gaussian noise n.

Figure 5:
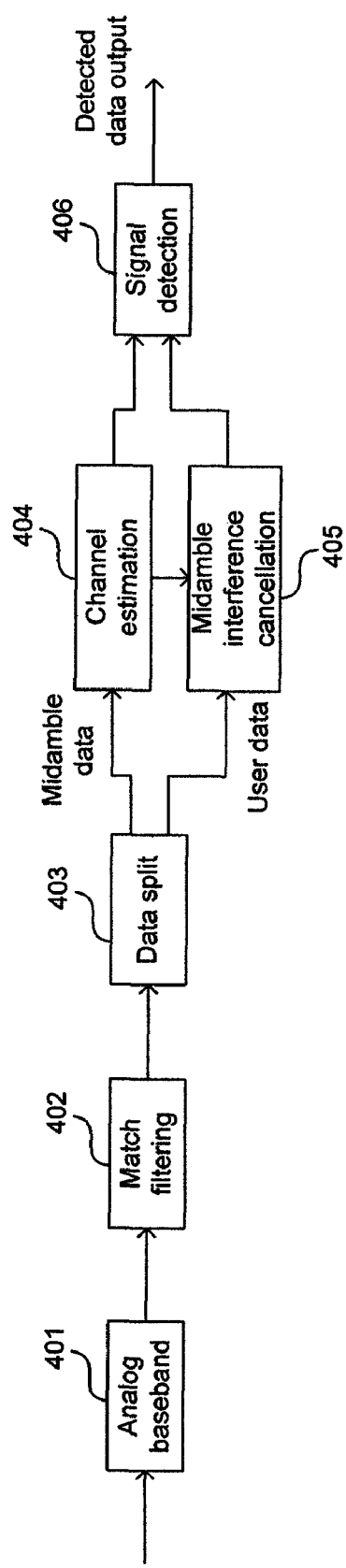
FIG. 5 is a diagram of single cell channel equalization.

Equalization algorithm includes time equalization and frequency equalization. FIG. 5 shows a diagram of a receiver employing the time equalization algorithm. The received signals are first sent to a data splitting unit 202, where the user data and the midamble data are split from the received signals. The midamble data are sent to the channel estimation unit 204 for channel estimation. The user data and the estimated channel are sent to the channel equalization unit 206 to perform channel equalization. The output data from the channel equalization unit 206 are sent to the de-scrambling unit 208 for chip-level descrambling. The de-scrambled data are sent to the de-spreading unit 210 to perform chip de-spreading. The de-spread data are sent to the soft demodulation unit 212 for soft demodulation of the user data, and then soft bits are achieved. The soft demodulated data, namely soft bits, are sent to the following process unit for decoding and further processing.

The channel equalization unit 206 is configured to perform the equalization of the user data, where zero-forcing (ZF) and minimum mean squared error (MMSE) algorithms can be applied.

A time equalization method includes the following operations:

The estimated channel, h(k),k=1,2, . . . ,$L_{max}$+16 are obtained in the channel estimation unit 204; the estimated channel h is noise-depressed; zeros are added to the noise-depressed channel h to form the multi-path with total 64 taps, thereafter, FFT is performed as: H=FFT(h(1),h(2), . . . ,h($L_{max}$+16),0,0, . . . ,0); then IFFT is performed as $$w = IFFT\left(\frac{1}{H}\right);$$

finally, 64 taps FIR filter can be constructed by the w.

Another time equalization method includes the following operations:

The estimated channel, h(k),k=1,2, . . . ,$L_{max}$+16 are achieved in the channel estimation unit 204; the estimated channel h is noise-depressed; the noise-depressed channel h performs z transform as H(z)=Z(h(n)); then an $L_{max}$=16 taps IIR filter can be constructed by $$\frac{1}{H(z)}.$$

The third time equalization method includes the following operations:

The estimated channel, h(k),k=1,2, . . . ,$L_{max}$+16 are achieved in the channel estimation unit 204; the estimated channel h is noise-depressed; the noise-depressed channel h performs z transform as H(z)=Z(h(n)); then a hybrid digital filter can be constructed by $$\frac{H^*(z^{-1})}{H^*(z^{-1}) * H(z) + \delta_n^2(z)}.$$

The noise depressing procedure is used for all the above three methods, the detailed noise depression is described as the following steps:

Step 1. calculating the taps power of the estimated channel h(k), which at most has $L_{max}$+16 chips (or taps);

Step 2. determine the maximum power as P=max($P_1 P_2$ . . . $P_{L_{max}+16}$);

Step 3. forming the noise-depressing threshold, such as Γ=γP, where γ for example is ¼ or ⅛;

Step 4. determine the set I as I={i|submitting to $P_i$<Γ,i=1,2, . . . ,$L_{max}$+16}, and to perform the noise-depressing as h(i)=0,i ∈ I.

Several embodiments of the above methods can also utilize the frequency equalization algorithm for the detection of the received TD-SCDMA signals, which is similar to that for OFDM detection. For example, suppose r is the received signal, h is the estimated channel, s is the transmitted signal. When the circular prefix of the transmitted s is larger than the maximum time delay of the channel h, r can be denoted as the circular convolution of h and s, i.e., r=h⊗s, and the frequency form of the received signal r can be denoted as FFT(r)=FFT(h)*FFT(s), then the detected signal s in frequency domain is FFT(s)=FFT(r)/FFT(h), which is the frequency equalization algorithm. The OFDM symbol can be constructed for TD-SCDMA system as followings:

When $L_{max}$>0, the delay of the estimated channel multi-path is larger than 16 chips. The received signals, which originate from the midamble data with $L_{max}$+16 chips to those of the next timeslot, form an OFDM symbol.

Figure 6:
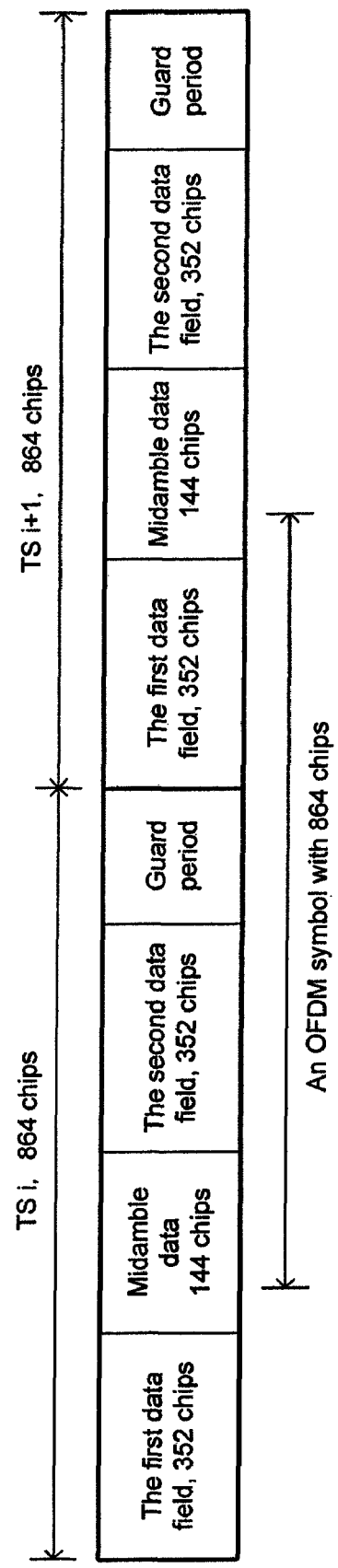
FIG. 6 is a diagram of an OFDM symbol without DwPTS.

As shown in FIG. 6, the OFDM symbol has 864 chips: the last part of the midamble data with a length of 128−$L_{max}$ chips; the second user data part of the first timeslot with a length of 352 chips; the guard period part with a length of 16 chips; the first user data part of the second timeslot with a length of 352 chips, and the first 128−$L_{max}$ chips of the midamble data part of the second timeslot. All these data form an OFDM symbol with a length of 864 chips.

Figure 7:
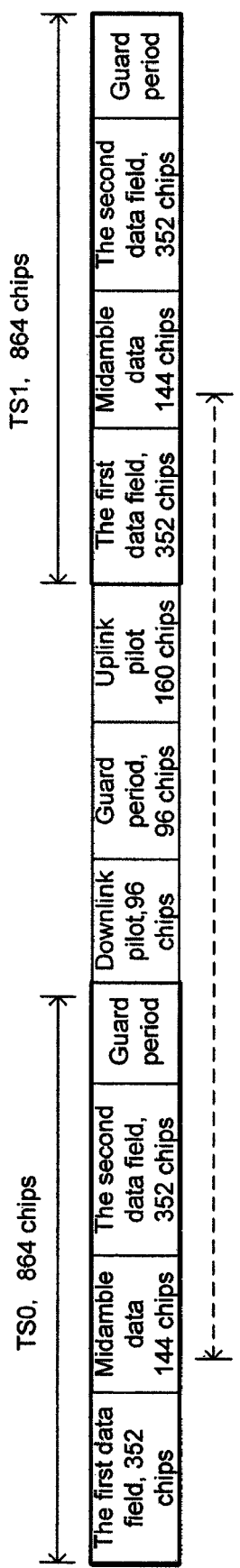
FIG. 7 is a diagram of an OFDM symbol with DwPTS.
Figure 8:
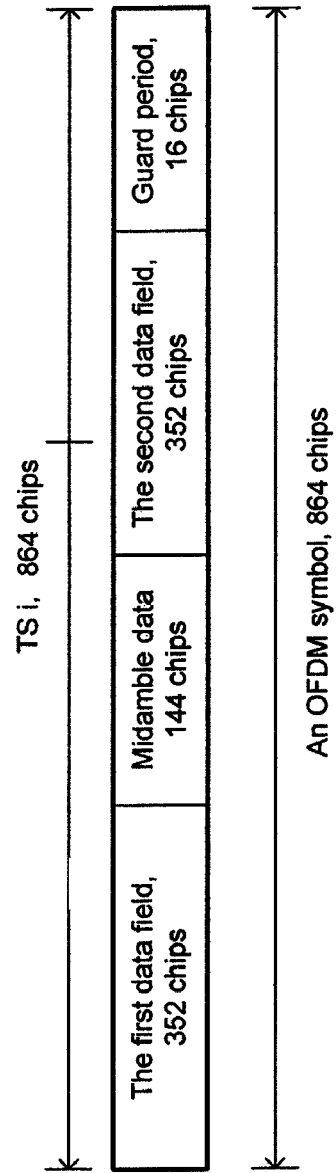
FIG. 8 illustrates an OFDM symbol including whole timeslots.

As shown in FIG. 7, the OFDM symbol has 1024 chips: the last 128−$L_{max}$ chips of the TS0 midamble data, the second part user data of TS0, the guard period of 16 chips, the DWPTS with length of 96 chips, the guard period of 32 chips, the inserted zeros with length of 32 chips, the first part of the user data of TS1, and the first $L_{max}$+16 chips midamble data. All these data form an OFDM symbol with length of 1024 chips. When $L_{max} \leqq 0$ is being configured, the received signals from TD-SCDMA downlink transmission in one downlink timeslot can be considered as an OFDM symbol with a length of 864 chips, as shown in FIG. 8.

For the two kinds of $L_{max}$ configuration described above, the frequency equalization algorithm is given as:

$$\hat{s} = IFFT\left[\frac{FFT(r)}{FFT(h, \text{zeros}(1, 864 - 16 - L_{max}))}\right] \quad \text{(Equation 4)}$$

From the foregoing, it will be appreciated that specific embodiments of the disclosure have been described herein for purposes of illustration, but that various modifications may be made without deviating from the disclosure. For example, many of the elements of one embodiment may be combined with other embodiments in addition to or in lieu of the elements of the other embodiments. Accordingly, the disclosure is not limited except as by the appended claims.

We claim:

1. A method for a single frequency network (SFN) based on a TD-SCDMA network, the method comprising:
dividing the TD-SCDMA network into two layers: one layer for a mobile communication network, and the other layer for a TD-SCDMA single frequency network (SFN), wherein the TD-SCDMA SFN is independent from the mobile communication network in which some frequency resources are reserved for the SFN only, or a partial timeslot resources are used for the mobile communication network, and the rest of the timeslot is used for the SFN service;
performing channel estimation; and
thereafter, performing signal detection using an equalization algorithm, wherein the equalization detection algorithm includes time equalizing and frequency equalizing, wherein performing signal detection further comprising:
sending received data to a data splitting unit where user data and midamble data are separated;
sending the midamble data to a channel estimation unit for channel response estimation;
sending the user data together with the estimated channel to a channel equalizer unit for equalization;
sending output data from the channel equalizer to a de-scrambling unit for chip-level de-scrambling;
sending chip de-scrambled data to a de-spreading unit for de-spreading;
soft de-modulating de-spread data in a soft demodulation unit to obtain soft bits; and
further processing the soft bits for decoding and service recovering.

2. The method of claim 1, wherein the estimated channel with total time duration of $L_{max}$+16 chips is obtained from the channel estimation unit; the estimated channel h is noise-depressed; 64 zeros are inserted to the noise-depressed channel h, after which FFT is performed as: H=FFT(h(1),h(2), . . . , h($L_{max}$+16),0,0, . . . ,0); then IFFT is performed to H as:

$$w = IFFT\left(\frac{1}{H}\right);$$

the equalizer is formed by w as a FIR filter structure.

3. The method of claim 2, further comprising:
calculating channel taps power $P_1 P_2 \ldots P_{L_{max}+16}$ from the estimated channel h(k) with $L_{max}$+16 chips time duration;
determining a maximum power as $P=\max(P_1 P_2 \ldots P_{L_{max}+16})$;
forming a noise-depressing threshold as: $\tau = \gamma P$, where $\gamma$ is a scalar value belonging to (0 1); and
setting an index as I={i|conditioned on $P_i < \tau$, i=1,2, . . . ,$L_{max}$+16}, and setting weak taps of the channel to zeros as h(i)=0,i∈I.

4. The method of claim 1, wherein the estimated channel with total time duration of $L_{max}$+16 chips is obtained from the channel estimation unit; the estimated channel h is noise-depressed; Z transform is performed as: H(z)=Z(h(n)); then the equalizer is formed by $$\frac{1}{H(z)}$$

as an IIR filter structure.

5. The method of claim 1, wherein the estimated channel with total time duration of $L_{max}$+16 chips is got from the so-called channel estimation unit; the estimated channel h is noise-depressed; Z transform is performed as: H(z)=Z(h(n)); then the equalizer is formed by $$\frac{H^*(z^{-1})}{H^*(z^{-1}) * H(z) + \delta_n^2(z)}$$

as a FIR/IIR hybrid filter structure, where $\delta_n^2(z)$ is the z transform of additive white noise.

6. A method for a single frequency network (SFN) based on a TD-SCDMA network, the method comprising:
dividing the TD-SCDMA network into two layers: one layer for a mobile communication network, and the other layer for a TD-SCDMA single frequency network (SFN), wherein the TD-SCDMA SFN is independent from the mobile communication network in which some frequency resources are reserved for the SFN only, or a partial timeslot resources are used for the mobile communication network, and the rest of the timeslot is used for the SFN service;
performing channel estimation; and
thereafter, performing signal detection using an equalization algorithm, wherein the equalization detection algorithm includes time equalizing and frequency equalizing, wherein an equalization algorithm of OFDM is applied for receiving and demodulating the TD-SCDMA SFN receiver; when parameter $L_{max} > 0$, a delay of an estimated channel multi-path is larger than 16 chips, received signals after a start of midamble data with $L_{max}$+16 chips delay to the next timeslot's midamble data forms an OFDM symbol.

7. The method of claim 6, wherein when $L_{max}>0$, received signals of a TD-SCDMA downlink transmission is regarded as an OFDM symbol with a length of 864 chips or 1024 chips.

8. The method of claim 7, wherein the OFDM symbol with a length of 864 chips comprises: the last part of the midamble data with length of $128-L_{max}$ chips, a second user data part of a first timeslot with length of 352 chips, a guard period part with length of 16 chips, a first user data part of a second timeslot with length of 352 chips, and the first $128-L_{max}$ chips of a midamble data part of the second timeslot.

9. The method of claim 7, wherein the OFDM symbol with length of 1024 chips comprises: the last $128-L_{max}$ chips of TS0 midamble data, second part user data of TS0, the guard period of 16 chips, a DWPTS with length of 96 chips, the guard period of 32 chips, inserted zeros with length 32 chips, a first part of user data of TS1, and first $L_{max}+16$ chips midamble data.

10. The method of claim 6, wherein a receiving method of the SFN broadcast based on TD-SCDMA network, is characterized in that: when $L_{max}\leq 0$, received signals from TD-SCDMA downlink transmission in one downlink timeslot is regarded as an OFDM symbol with a length of 864 chips.

* * * * *